Sept. 15, 1931.  A. R. HAYSEL  1,822,888
MEANS FOR TREATING OIL
Filed Sept. 17, 1928

INVENTOR:
Arthur R. Haysel
White, Prat & Fryer
ATTORNEYS.

Patented Sept. 15, 1931

1,822,888

UNITED STATES PATENT OFFICE

ARTHUR R. HAYSEL, OF LOS ANGELES, CALIFORNIA, ASSIGNOR OF FORTY-NINE ONE-HUNDREDTHS TO CHARLES THOMPSON AND GEORGE K. THOMPSON, OF LOS ANGELES, CALIFORNIA, COPARTNERS DOING BUSINESS AS CHAS. & GEO. K. THOMPSON, OF LOS ANGELES, CALIFORNIA

MEANS FOR TREATING OIL

Application filed September 17, 1928. Serial No. 306,356.

This invention relates particularly to mixer heads used in the refining of petroleum products. Various methods and processes have been used for the purification of such products. Of these, one of the oldest is known as sun bleaching. The sun's rays decompose many of the color-giving constituents and in this way clarify the oil and make it acceptable to buyers. This process is not in good repute with refiners today for they have found that while some of the undesirable compounds have been destroyed, others equally as bad have been created.

Another method in common use is to pass the lubricating oils and waxes thru filtering media to remove asphaltic and similar bodies and thus improve the color. This is ordinarily done in filter tanks which are from 6 to 10 feet in diameter and from 15 to 30 feet in depth.

One of the most common methods of purification is that of acid agitation. To remove resinous matter, unsaturated and aromatic hydro-carbons which discolor, give obnoxious odors to the oil, burn poorly, or corrode machinery, sulphuric acid is intimately mixed with the product to be purified and serves as a scavenging reagent. This must be followed later by neutralization with caustic soda and washing with water. The agitators used in obtaining an intimate mixture are huge cylindrical shaped tanks with domed roofs and conical bottoms and are usually set upon frames above the ground. The largest ones have a capacity of five thousand barrels and are constructed of walls made of wrought iron or steel lined with acid resisting material such as lead or antimonial lead. The oil and the acid are pumped into the agitator from different lines at the beginning of the process. Obviously such agitators are very expensive and furthermore the mixture obtained by them is more or less incomplete. To compensate for this, greater quantities of acid have to be used, which of course increases the cost of operation.

In general it is the object of this invention to provide a mixer head in which advantage has been taken of the various physical laws, including laws which govern turbulent flow and the relationship of velocity to pressure, in promoting interaction of fluids; an advantageous embodiment of my invention may comprise means and methods effective not only to produce fine initial subdivision and turbulent flow, but to maintain such turbulent flow for a suitable interval of time.

More specifically it is the object of this invention to provide a mixer head comprising a mixer housing provided with an axial opening, a turbulence head closing the upper end of said mixer housing, an apertured baffle plate interposed between the mixer housing and the turbulence head, a turbulence chamber secured within said mixer housing and provided with an inwardly directed nozzle spaced from the axial opening therein, and a longitudinally adjustable nozzle secured in said axial opening.

The invention possesses other advantageous features, some of which with the foregoing will be set forth at length in the following description where I shall outline in full that form of my invention which I have selected for illustration in the drawings accompanying and forming part of the present specification. In said drawings I have shown one form of my invention, but it is to be understood that I do not limit myself to such form since the invention, as set forth in the claims, may be embodied in a plurality of forms.

Referring to the drawings.

Figure 1:
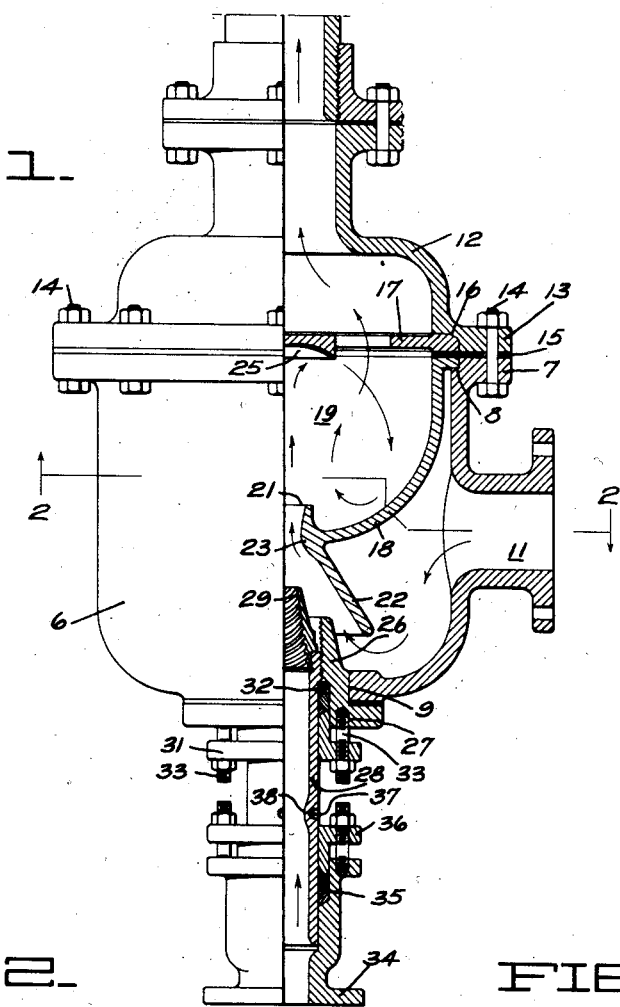
Fig. 1 is a front elevation the right half of which has been shown in section.
Figure 2:
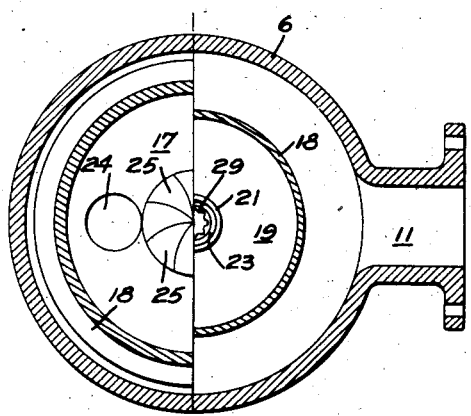
Fig. 2 is a horizontal section taken on the broken line 2—2 of Fig. 1.

My invention contemplates the use of a mixer housing 6 provided at its upper end with a circumferentially apertured flange 7 and with an annular recess 8. As best shown in Fig. 1, the lower end of the housing 6 is provided with a restricted axial opening 9. One side of the mixer housing 6 is provided with a fluid inlet 11.

Closing the top of the mixer housing is a turbulence head 12 the lower end of which is provided with a peripherally apertured flange 13 adapted to register with the flange 7 of the mixer housing and to be secured thereto by means of bolts 14 passing thru the apertures therein. As shown in Fig. 1, a gasket 15 is interposed between the flanges 7 and 13. An annular recess 16 is provided in the lower face of the flange 13 which forms together with the annular recess 8, an annular channel.

Clamped within the channel so formed is an apertured constriction or baffle plate 17 and a depending bowl shaped member 18 which, together with the baffle plate 17, forms a turbulence chamber 19.

Formed integral with the member 18 is an inwardly extending nozzle 21 the lower end of which is outwardly flared as at 22. It is to be noted that the opening of this nozzle has been constricted by means of what may be termed a bead 23, the inner cross-sectional contour of which closely resembles the upper surface of an aeroplane wing. On top of an aeroplane wing, the flow of air is turbulent and the entire upper surface is under suction which produces a considerable lift. The same action is produced by the applicant's nozzle structure as will later be described.

Figure 3:
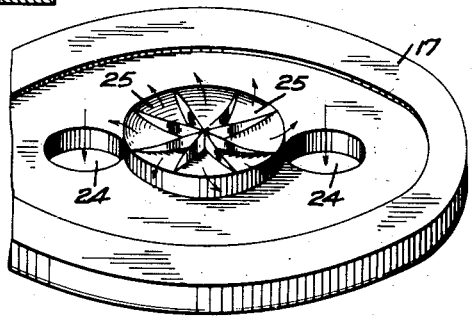
Fig. 3 is a perspective view of the apertured, channelled baffle plate forming part of the interior of the mixer head.

The baffle plate 17 is provided with a plurality of circularly disposed orifices 24. Centrally disposed on the under face of the baffle plate are a plurality of fan-shaped grooves or channels 25. In order to more clearly disclose this channel structure, the baffle plate 17 has been shown in Fig. 3 in an inverted position.

Secured in the constricted opening 9 of the mixer housing 6 by a force fit or any other suitable means, is an internally threaded nipple 26. The lower end of this nipple is flanged and is provided with a plurality of peripherally disposed threaded holes 27. Threadedly secured within the nipple 26 is a short piece of tubing 28 the upper end of which is internally threaded and carries a rifled nozzle 29. A gland 31 and packing 32 serve to seal the tubing 28 with the nipple 26. As clearly shown in Fig. 1, relative motion between the nipple 26 and the gland 31 is accomplished by means of the bolts 33. The lower end of the tubing 28 is provided with a pipe fitting 34 which is sealed to the tubing by means of packing 35 and a gland 36 as shown. Wrench openings 37 have been provided in the tubing 28 intermediate its end, and to compensate for the weakening at this point it has been thickened as at 38. As can readily be seen, this construction permits the longitudinal adjustment of the rifled nozzle 29 even while the mixer head is in operation. This action is of course made possible due to the fact that the nozzle 29 is carried by the tube 28, which because of the fact that it is in threaded engagement with the nipple 26 may be made to travel longitudinally by merely rotating it. Since the space between the nozzles 21 and 29 may be varied at will by the longitudinal adjustment of the nozzle 29, the scavenging reagent which enters thru the fluid inlet 11 and which passes thru the space between the two nozzles, may be positively controlled.

In operation the pipe fitting 34 is connected with the source of fluid to be purified. This fluid is usually rather light and is introduced at a relatively high pressure (about 100 lbs.). The fluid inlet 11 is connected with the scavenging reagent tank. As above stated the reagent customarily used for the refining of petroleum products takes the form of sulphuric acid and may be introduced at a lower pressure, usually at its own static head. The upper end of the turbulence head 12 is connected with suitable washing tanks.

The rifling in the nozzle 29 imparts a vortical motion to the fluid to be purified and gives its outer surface a corrugated form. It will be noted that the outer surface of this fluid, due to its vortical and helical path has an actual velocity far in excess of its vertical component along the axis of the mixer head, and in passing the bead 23 on the nozzle 21 creates an area of low pressure or a vacuum in the space between the two telescoped nozzles. Due to this area of low pressure, the scavenging reagent, entering the fluid inlet 11, is drawn thru this space and is entrained or rolled in the vortically moving, corrugated surface of the fluid to be purified. The fluids so interengaged impinge upon the channelled surface of the baffle plate 17. During the interval of travel between the nozzles and the baffle plate, there has been relative motion between the two fluids, causing their interaction and subdivision. On impinging against the baffle plate 17, due to the direction of the grooved channels 25, the fluids are further subdivided and mixed, and are deflected with an increased vortical motion. After being deflected from the baffle plate 17, the interengaged fluids are subjected to a turbulent action in the turbulence chamber 19 and follow the path as indicated by the arrows in Fig. 1. It will be noted that the path of the fluids crosses itself before reaching the circularly disposed orifices 24. On passing thru the orifices 24, the fluids are subjected to a still further subdivision, in that they are contracted and expanded in passing therethru so that by the time the fluids have reached the turbulence head 12, each fluid has been completely dispersed and intimately mixed with the other. This action produces a substantially homogeneous liquid mixture.

In contrast to the agitators usually used, a mixer head constructed as above described stands only about twenty-four inches high, but due to its construction and operation a far more intimate mixture is produced by it than by an agitator. This decreases the quantity of scavenging reagent necessary to purify a given amount of oil, thereby materially decreasing the operating cost. The longitudinal adjustability of the nozzle 29 permits the amount of scavenging reagent used to be accurately controlled at all times.

This application is a continuation in part of my co-pending application Serial Number 222,622, filed September 28, 1927, entitled "Mixer head".

I claim:

1. A mixer head comprising a mixer housing, means for creating a vortically moving jet of fluid within said housing, a second and means for entraining a predetermined quantity of a second fluid within said jet and a third means including a channelled baffle plate for effecting an extended turbulent action within the interengaged fluids.

2. A mixer head comprising a mixer housing provided with an axial inlet opening, a turbulence head enclosing the upper end of said mixer housing and having an outlet opening, an apertured baffle plate interposed between the mixer housing and the turbulence head, a turbulence chamber secured within said mixer housing and provided with an inwardly directed nozzle spaced from the axial opening therein, and a longitudinally adjustable nozzle secured in said axial opening.

3. A mixer head comprising a mixer housing, a turbulence chamber secured within said housing and provided with an inwardly extending fixed nozzle, an apertured channeled baffle plate disposed in said housing, and a longitudinally adjustable internally rifled nozzle secured to said housing and concentrically disposed with respect to said first mentioned nozzle.

4. A mixer head comprising a mixer housing, a pair of telescoped nozzles one of which is rifled secured within said housing, means in said housing for effecting the entrainment of fluids passing thru said nozzles and means effective during the operation of said mixer-head for changing the ratio of the quantities of fluid passing therethru.

5. A mixer head comprising a mixer housing, a rifled nozzle in said housing, means for longitudinally adjusting said nozzle, and a second nozzle in said housing for directing a jet of fluid about said rifled nozzle, said second nozzle being provided with an inwardly extending bead for creating an area of low pressure above said jet.

6. A mixer head comprising a mixer housing, a longitudinally adjustable rifled nozzle in said housing, a second nozzle for directing a jet of fluid around said rifle nozzle, and means on said second nozzle for forming a constricted Venturi chamber.

7. A mixer head comprising a turbulence chamber, a plurality of spaced telescoped intake nozzles in communication with said chamber, one of which is rifled and longitudinally adjustable, and a baffle plate in alignment with said nozzles.

8. A mixer head comprising a casing, an inlet opening, an outlet opening in alignment with said inlet opening, a longitudinally adjustable rifled nozzle extending from said inlet opening, a second nozzle concentrically disposed about said first nozzle and having communication with a second inlet opening, and a baffle plate in alignment with said nozzles.

In testimony whereof, I have hereunto set my hand.

ARTHUR R. HAYSEL.